Dec. 11, 1962     J. M. BATCHELDER     3,067,932
COMPUTER

Filed April 8, 1953                  2 Sheets-Sheet 2

INVENTOR
JOHN M. BATCHELDER

BY

ATTORNEY

United States Patent Office 3,067,932
Patented Dec. 11, 1962

3,067,932
COMPUTER
John M. Batchelder, 91 Albemarle Road,
White Plains, N.Y.
Filed Apr. 8, 1953, Ser. No. 347,632
12 Claims. (Cl. 235—61.5)
(Granted under Title 35, U.S. Code (1952), sec. 266)

The invention described herein may be manufactured and used by or for the Government of the United States of America for governmental purposes without the payment of any royalties thereon or therefor.

The invention relates to computers in general and more particularly to a calculating device primarily adaptable for military use to show functions of bombs or projectiles designed to burst above the ground. Said device is capable of use for various types of projectiles and bombs and can be used for atomic or explosive-type bombs or weapons, ground illuminating flares and for missiles, carrying bacteria, biological or chemical materials.

In military bombing operations, numerous calculations must be made for determining what will be most effective in the nature of bomb strength, altitude of drop and effective distance or range. For high explosive or atomic type weapons, strength or yield varies with bombs of different size and content. Also, heat radiation must be considered from two aspects, namely, the ability to cause fires or burning of military installations, and, its effect upon human beings. Additional factors to be considered are height of bomb burst to produce the most destructive effect in the case of explosive bombs, the maximum illumination for a specific area in the case of flares and the greatest dispersement of biological agents or chemicals in the use of biological or chemical weapons. A further factor to be taken into account is the most effective range of any given burst for a desired damage.

An object of the invention is to provide a calculating device that will readily solve problems involving numerous variables.

Another object of the invention is to provide a calculating device that will eliminate the necessity for reference to printed information and charts usually found in book form.

A further object of the invention is to abolish the requirements for calculations made with pencil and paper, conventional slide rule, or more complicated computer mechanism.

A still further object is to provide a calculating mechanism that is easy to manipulate, small in size and inexpensive to manufacture.

Still another object is to provide a computer that is capable of construction on a very large scale for use as a demonstration device in classroom instruction.

A more specific object is to provide a calculating device that is capable of solving a series of problems in succession.

Another specific object of the invention is to provide a device into which numerous variables can be introduced for obtaining a series of answers with a minimum of time and operation.

A further specific object is to provide a computing device into which can be introduced one or more variables in the ordinate and/or abscissa values of a right triangle prior to using these values to read the parameter which they define.

A still further specific object is to provide a device that will permit the introduction of a number of variables that are not limited to the ordinate and abscissa scales so that for any setting of an ordinate or abscissa value, a fixed setting of any third value can be introduced while permitting variations in the ordinate and/or abscissa value without disturbing the setting of the third value.

Still another specific object is to provide a device that gives the solution of a problem requiring a series of operations, wherein interchangeability is possible between the variables or value to be held constant and those allowed to vary independently.

Other objects and many of the attendant advantages of this invention will be readily appreciated as the same becomes better understood by reference to the following detailed description when considered in connection with the accompanying drawings wherein.

Figure 1:
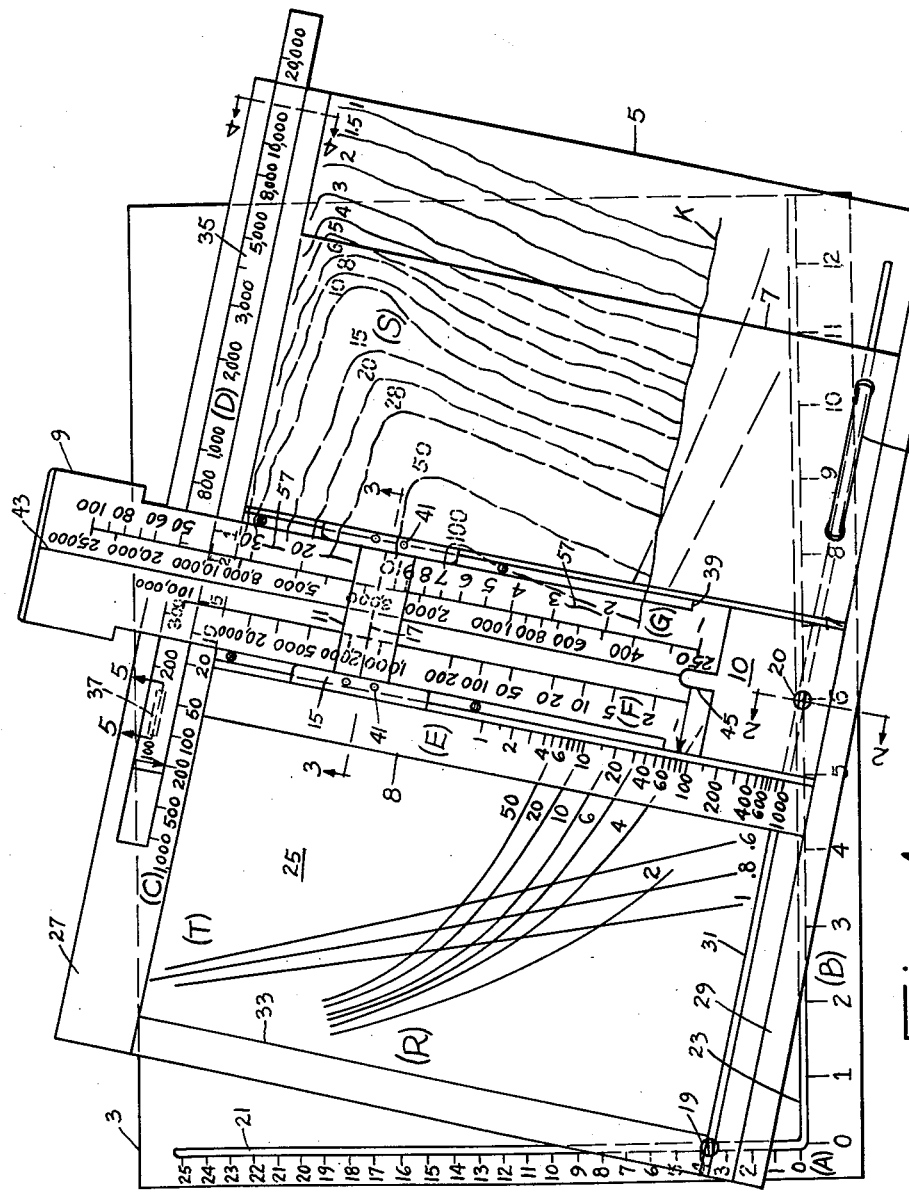
FIG. 1 is a top-plan view of a device embodying the invention.

Essentially the device consists of five superimposed elements, namely, a base plate or support 3, an adjustable plate 5, a slide plate 7, a strip 9 and a cross hair 11 that are made of a suitable transparent material, preferably of plastic (see FIG. 1). Certain portions of plate 5 are translucent rather than transparent. Transparency is provided along the edge 33 of said plate 5 to allow scale A to be seen readily. The remaining surface 25 is roughened throughout so that information in the form of graphs or charts can be inscribed thereon by any suitable means. Two graphs R and S are necessary for use of the invention and a third graph T may also be utilized.

Adjustable plate 5 is capable of movement upon base plate 3 to various positions. Motion of plate 5 is restricted by two pins or studs 19 and 20. Stud 19 is fixedly mounted in plate 5 and is capable of sliding in slot 21 of base plate 3. Slot 23 of base plate 3 is at right angles to slot 21 and the two scales A and B adjacent said slots represent the X and Y sides of a right triangle, X being the ordinate and Y the abscissa. The hypothenuse of such triangle is formed by slot 31 in plate 5, thereby making studs 19 and 20 and the point of intersection of slots 21 and 23 actually forming the three corners of the right triangle.

Figure 2:
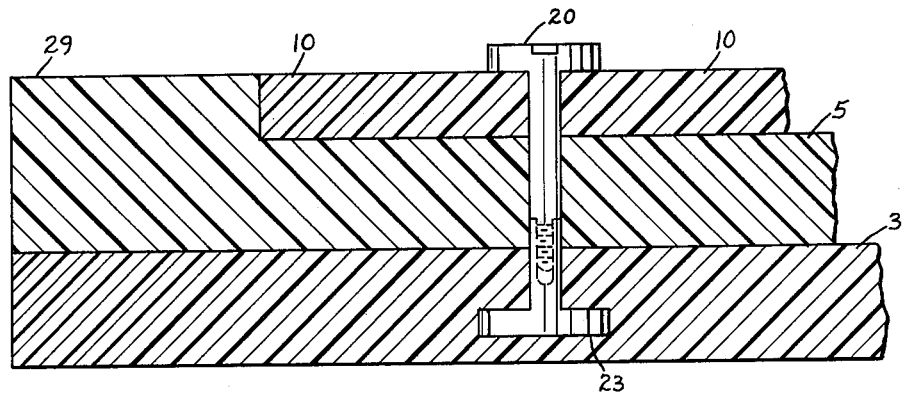
FIG. 2 is a cross sectional view of the invention taken along line 2—2 of FIG. 1.
Figure 4:
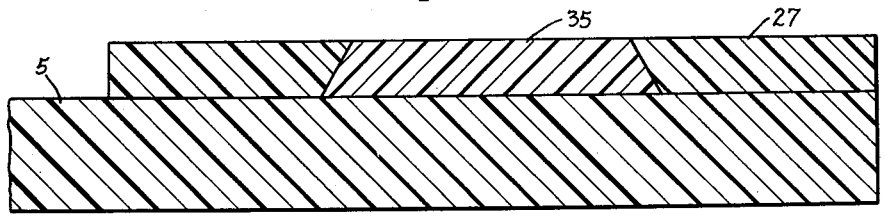
FIG. 4 is a sectional view of the invention taken along line 4—4 of FIG. 1.

Stud 20 is slidable in T-shaped slot 23, the mounting arrangement being similar to mounting stud 19 and slot 21 (see FIG. 2). Said stud 20 is fixedly secured in slidable plate 7 to insure that stud movement will result in plate movement. The shaft of stud 20 passes through slot 31 of plate 5, thus, said stud is simultaneously slidable in both slots 23 and 31.

Stud 20 can be moved to a selected scale setting without changing the position of stud 19 along the A scale. If desired, both studs 19 and 20 can be moved simultaneously along their respective slots. In a like manner, stud 19 can be moved to a selected scale setting without changing the position of stud 20 along the B scale. Movement of stud 19 upwardly without changing the position of stud 20 produces sliding movement of plate 7 from left to right across the surface of plate 5 between the two raised parallel guides 27 and 29, while producing both sliding and rotational movement of plate 5 over base 3 about stud 20 as a pivot. Movement of stud 20 from left to right without altering the position of stud 19 causes plate 7 to move from left to right across plate 5, resulting in pivoted but not sliding motion of plate 7 over base 3 about the axis of stud 19. Movement of said plates is readily effected by using handle 13 mounted on plate 7.

Figure 3:
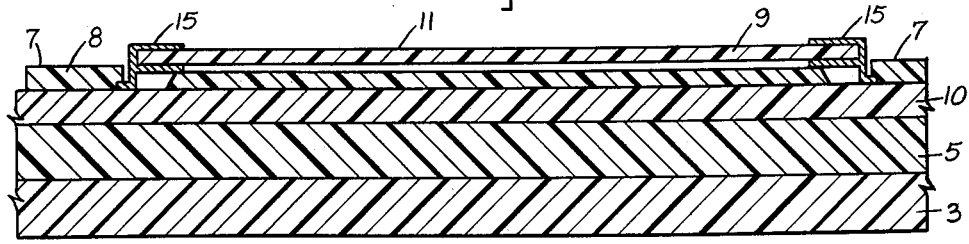
FIG. 3 is a cross-sectional view of the invention taken along line 3—3 of FIG. 1.

Plate 7 is composed of layers 8 and 10 as shown in FIG. 3. This specific arrangement is not necessary because said plate could be cut from a dense single thickness material. A part of layer 8 is cut away to form a transverse channel for slidably mounting transparent strip 9 for movement in a direction normal to that of slot 31 (see FIG. 3). Abutment 39 of strip 9 engages four stops or studs 41 in plate 7 to eliminate lateral movement of said transparent strip. Studs 41 are small and occupy only a portion of channel space between strip 9 and the adjacent part of layer 8 to provide clearance for slidable metal carriers 15 which support cross-hair slide or cursor 11. Said slide 11 is similar in function to those used in the ordinary slide rule and has a cross line 17 for reading values accurately. Line 17 also permits the use of a number of scales on strip 9 if a larger number of values were to be read by means of slide 11.

Scale line 43 on strip 9 is perpendicular to slot 31. The lower end of strip 9 is recessed at 45 to receive the head of stud 20 so that the lower-most point on scales F and G coincide with stud 20 and slot 31 when strip 9 is in its lower-most position of adjustment.

Figure 5:
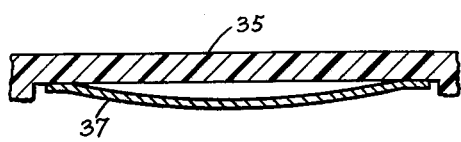
FIG. 5 is a detailed sectional view of a spring friction means utilized in the invention.

A guide channel in edge portion 27 of plate 5 is designed to accept a slide 35. This slide is capable of movement into and out of said channel beneath strip 9 in a direction parallel to slot 31 and perpendicular to the movement of strip 9. A flexible friction spring (see FIG. 5) retains slide 35 in any adjusted position.

The device as described uses seven scales and at least two graphs. The scales are represented by letters A, B, C, D, E, F and G, respectively. The graphs are represented by letters R, S and T. When the device is employed in connection with detonation type bomb explosions, the scales and graphs have the following designations:

A—Burst altitude in thousands of feet.
B—Ground distance in yards.
C—KT yield in kilotons of energy (total).
D—Ground blast distance in yards.
E—KT yield in kilotons of energy (total).
F—Gamma radiation in roentgens or heat in calories per centimeter squared, c./cm.$^2$ (per 1 KT).
G—Height of burst (log scale) in feet.
R—(Heat graph) visibility measured in miles.
S—(Ground blast graph) blast over-pressure in lbs./sq. in.
T—(Gamma graph) total amount of heat/unit area for a given visibility. Relative air density.
K—Surface burst line.

When the device is used in connection with bombs employed to disseminate biological agents or as illumination or flash bombs, the scales and charts would be calibrated to represent the following:

A—Height of burst in feet.
B—Ground distance in feet (or yards).
C—Candlepower (log scale).
D—Ground distance in feet (or yards) (log scale).
E—Candlepower (amount of agent) (plotted on log scale).
F—Light per unit area (concentration of chemical or biological agent).
G—Height of burst plotted on log scale.
R—Chart showing lines of attenuation of effect per unit of distance according to visibility (attenuation of concentration per unit of distance carried by wind). Visibility values are in miles.
S—Lumens (amount of light over a given area).

The point of intersection of slots 21 and 23 represent the zero position of scales A and B. Scale A is laid off in thousands of feet to represent in this case the altitude above the earth. This is the ordinate scale. The abscissa or B scale may be laid off either in feet or yards, whichever is most convenient. For purposes of illumination, the B scale is laid off in yards.

The C and D scales are both logarithmic but are of different phase lengths, scales E, F, and G are also logarithmic. The ranges of the various scales are selected to provide maximum information within the most practical or useful limits of the graphs. For instance, the first number on the G scale is 250 because it is impractical or inadvisable to set off a bomb below this altitude.

The graphs or charts R, S and T are laid out on the translucent surface 25 of the plate 5 as follows:

The lines for graph R are laid out with stud 19 as the zero point of the abscissa and ordinate. This may be termed the heat chart, and each curved line is marked in miles of visibility since the heat is directly proportional to the visibility. The abscissa distances are measured from stud 19 out along slot 31 in increments corresponding to scale B. The ordinate distance is measured perpendicular to slot 31 from stud 19 in values or increments of scale F. By means of providing relative slidability between scales E and F, the values read off graph R are factored in terms of any particular setting along scale E.

The lines for graph S are laid out on surface 25 with the vertical line 57 forming the ordinate axis. This graph is the blast chart, and each curve is marked according to ground pressure effect in pounds per square inch overpressure. This line 57 is aligned in the unit 1 on the C scale in the same increments as those on scale G. Measurements on the abscissa scale originate at line 57 and are made along scale D from left to right away from line 57. The reference point for obtaining the abscissa line runs parallel to slot 31 in line with the unit 1 marking on the E scale. The portions of the curves between this base line (not shown) and the line K is an extrapolation of data which is included to give information at low elevations on the G scale in cases where high values of yield exist on the E scale.

The lines for graph T are laid out with the ordinate axis being measured along a line (not shown) which is parallel to line 43 and passes through stud 19, the stud forming the zero point. This may be termed the gamma chart, the curves representing the amount of gamma radiation per unit area for a given air density. The vertical increments are measured in thousandths of the values appearing on scale F. It is seen that the value will be 1 when strip 9 is in its lowered position where the value of 1000 on the F scale aligns with the value 1 on the E scale. The abscissa is measured along slot 31 in values of distance marked on the B scale.

In order to fully appreciate the extent to which the invention can be readily employed, a typical problem on the device shown in FIGS. 1 through 4 will be solved:

(1) Given:
(a) A bomb having a yield of 83 IT (kilotons).
(b) The target to be attacked with friendly bombs can be destroyed by 28 p.s.i. (pounds per square inch) overpressure.
(c) The horizontal visibility in the objective area is 20 miles at all times.
(d) Maximum permissible effects on friendly forces as a result of friendly attacks: Heat=2 calories/centimeter $^2$; blast=4 p.s.i.; gamma=25 roentgens.

(2) Problem:
(a) What is the height of burst which will maximize the area of the desired 28 p.s.i. overpressure?
(1) Set the arrow on scale D of slide 35 and the arrow on scale F of strip 9 opposite the known KT value of 83 on scales C and E.
(2) Move the slide 9 to a position on the blast chart S where the line 43 touches the right-most point or peak of the desired p.s.i. curve 28.
(3) Set the slide 11 directly over this peak point so that the crossline 17 intersects the line 43. The height of burst (Hb) for the blast will then be indicated as 3000 feet on the G scale.
(b) What is the ground radius of the desired p.s.i. over-pressure?

(4) Read under the line 43 a value of 1210 yards on the D scale.

(c) What will be the radial range of blast (4 p.s.i.), heat (2 cal./cm.²) and gamma dose (24 R) permissible on friendly forces if bombs are detonated at desired height of 3000 feet?

(5) With stud 19 set at 3000 feet, move the plate or slide 7 to a position where the hairline 17 (remaining at the 3000 foot setting on the G scale) crosses the curve of 4 p.s.i. (which is the curve of maximum allowable p.s.i. on friendly forces) and read the range value under line 43 of 3650 yards on the D scale.

(6) Plate 5 is positioned so that the screw or stud 19 is at a height of burst value of 3000 feet on the A scale. The stud should be held at this position by some method such as screw tightening.

(7) Set the hairline 17 on the maximum allowable gamma dose 25 R on the F scale.

(8) Move the slide 7 by means of handle 13 to slide stud 20 along slot 23 to a position where the cross-hair 17 is above and intersects a specific one of the curves in the gamma curve graph T at the curve of appropriate air density (assume a value of 1 for the problem) in the gamma curve family. The position of stud 20 will then be at 2275 yards on the B scale.

(9) Set line 17 on the maximum allowable heat of 2 cal./cm.² on the F scale.

(10) With stud 19 fixed at 3000, move the slide 7 to a position where the intersection of cross-hair 17 with line 43 is above the appropriate curve on graph R for an approximate visibility of 20 miles. The range may then be read at stud 20 along B scale at 7200 yards.

Another typical problem would be to assess the effect of an enemy weapon.

(1) Given:

(a) An enemy delivered bomb was observed to burst at 1000 feet altitude at a range of 2450 yards from an observation post where the gamma radiation is measured at 7 roentgens.

(b) The horizontal visibility is 20 miles and the relative air density is 1.

(c) Exposed personnel on the beach were 4800 yards from the zero point on the ground directly below the burst. Other exposed personnel were in landing craft at 4400, 4000, 3600, 3200, 2800, 2400 and 2000 yards from the surface zero point.

(2) Problem:

(a) What was the yield of the enemy weapon?

(1) Set stud or screw 19 at the 1000 foot height on scale A.

(2) Set the stud or screw 20 to the value of 2450 yards on scale B by moving slide 7 and the stud therewith along the slot 23.

(3) Move slide 11 until cross-hair 17 intersects the line 43 at the 1 or unit line on the gamma graph T.

(4) While holding the slide 11 at its set position, move the strip 9 until the gamma dose of 7 R on the F scale is below the hairline 17. The KT yield of 23 will then be read on scale E opposite the arrow on scale F.

(b) To what amount of heat were personnel at each range subjected?

(1) Leaving the stud 19 at the 1000 foot setting and the arrow of the F scale set on 23 of the E scale, the slide 7 and stud 20 therewith are moved to each successive range on scale B representing the location of the various personnel.

(2) At any one location, the slide 11 is moved so that line 17 intersects line 43 at the 20 mile visibility curve on graph R.

(3) The heat amount delivered is then read on scale F under line 17.

By using the gamma scale F in conjunction with the gamma curves of graph T, the amount of gamma radiation delivered at each of the personnel positions may be determined by the same type of operation as for determining heat.

Obviously many modifications and variations of the present invention are possible in the light of the above teachings. It is therefore to be understood that within the scope of the appended claims the invention may be practiced otherwise than as specifically described.

What is claimed is:

1. A computer of the character described comprising a support having thereon fixed graduated scales disposed at right angles to one another and adapted to constitute the legs of any series of right triangles, slots on said support arranged parallel with said fixed graduated scales, superimposed plates, means carried by the plates for movement in said slots, each of said plates having a fixed graduated scale thereon, said plate scales being disposed at right angles to each other, a graduated slide mounted in a guide channel on one of said slidably mounted plates and adapted for movement relative to the fixed graduated scale on said plate, a strip having a scale line and a plurality of graduated scales mounted on the other plate for movement relative to the graduated scale on said other plate, a plurality of graphs on said slide carrying plate, and cursor means mounted on said other plate for movement relative to said strip.

2. A computer of the character described comprising a support having slots therein, said slots disposed at right angles to each other and adapted to constitute the ordinate and abscissa of any series of right triangles, fixed scales graduated on said support along said slots, the intersection of said slots representing the zero position of said scales, a pair of superimposed plates, means carried by the plates for movement in said slots relative to said support, each of said plates having a fixed graduated scale thereon, the scales being disposed at right angles to each other, a graduated slide mounted in a guide channel of one of said plates and adapted for movement relative to the fixed graduated scale on said plate, a strip having a scale line and a plurality of graduated scales mounted on the other of said plates for movement relative to the graduated scale on said other plate, a plurality of graphs on said slide carrying plate, and cursor means mounted on said other plate for movement relative to said strip, wherein for any value setting of an ordinate or abscissa on the fixed graduated scales of said support, a fixed setting of a third value can be introduced permitting variations in the ordinate and abscissa value without disturbing the setting of the third value.

3. A computer of the character described comprising a support having slots therein, said slots disposed at right angles to each other and adapted to constitute the ordinate and abscissa of any series of right triangles, fixed scales graduated on said support along said slots, the intersection of said slots representing the zero position of said scales, a pair of studs, one stud associated with said ordinate slot and the other stud associated with said abscissa slot, two plates superimposed on said support and slidably mounted relative to said slots by means of said studs, for rotational movement relative to said support, each of said plates having a fixed graduated scale thereon, the scales being disposed at right angles to each other, a graduated slide mounted in a guide channel of one of said plates and adapted for movement relative to the fixed graduated scale on said plate, a strip having a scale line and a plurality of graduated scales mounted on the other of said plates for movement relative to the graduated scale on said other plate, a plurality of graphs on said slide carrying plate, and cursor means mounted on said other plate for movement relative to said strip, wherein for any value setting of an ordinate or abscissa on the fixed graduated scales of said support, a fixed setting of a third value can be introduced permitting variations in the ordinate and abscissa value without disturbing the setting of the third value.

4. The invention as defined in claim 3 wherein said pair of studs provide indexing means for reading the answers on the ordinate and abscissa scales on said support.

5. The invention as defined in claim 3 wherein an upward movement of the stud associated with the ordinate scale, the stud associated with the abscissa scale being held constant, provides a sliding movement of said other plate from left to right across the surface of said slide carrying plate, while producing both a sliding and rotational movement of said slide carrying plate over said support about said ordinate stud as a pivot.

6. The invention as defined in claim 3 wherein a movement from left to right of said stud associated with the abscissa scale, the stud associated with the ordinate scale being held constant, provides a sliding movement of said other plate from left to right over said slide carrying plate, resulting in pivoted but not sliding motion of the other plate over the abscissa stud as a pivot.

7. A computing device into which one or more variables can be introduced into the ordinate and abscissa values of a right triangle prior to using such values to read the parameter defined by such values comprising supporting means having graduated slots disposed at right angles to each other, and intersecting at a zero reference point, said slots adapted to constitute the ordinate and abscissa of any series of right triangles, a plurality of superimposed plates, means for slidably mounting said superimposed plates on said support for movement, relative to said support and to each other, said plates each having a fixed graduated scale thereon, a graduated slide mounted in a guide channel of the first of said plates and adapted for movement relative to the fixed graduated scale on said plate, a strip having a plurality of graduated scales mounted on the second of said plates for movement relative to the graduated scale on said plate, said strip adapted to slide over said graduated slide at right angles to said slide, a plurality of graphs on said first plate, and cursor means mounted on said second plates for movement relative to said strip.

8. The invention as defined in claim 7 wherein said strip having a plurality of graduated scales thereon includes a scale line, said scale line adapted to intersect and to line up tangentially with at least one of the graphs on said first plate whereby a parameter reading is obtained on one or more of the graduated scales.

9. The invention as defined in claim 7 wherein said graduated slide is positively positioned by spring means in said guide channel for a particular setting.

10. A computing device of the character described comprising a base plate having slots therein, two superimposed plates mounted for movement in said slots and relative to said base plate, fixed graduated scales mounted on said base plate, disposed at right angles to one another and adapted to constitute the legs of a right triangle, a fixed graduated scale mounted on the first of said superimposed plates, a graduated slide mounted in a guide channel in said first superimposed plate and adapted for movement relative to said plate, and said graduated scale, a plurality of graphs on said first superimposed plate, a fixed graduated scale mounted on the second of said superimposed plates, a strip having a plurality of graduated scales mounted on said second superimposed plate for movement relative to said plate and said graduated scale and adapted for movement over and at right angles to said graduated slide, and a cursor mounted on the second superimposed plate and adapted for movement relative to said plate and said strip, whereby a series of variables can be introduced into the device to obtain a series of answers.

11. A computer of the character described comprising a support, a first slot in said support, a second slot in said support and at right angles to said first mentioned slot wherein said first mentioned slot constitutes the ordinate and said second slot constitutes the abscissa of any series of right triangles, a graduated scale on said support to cooperate with said first mentioned slot, a second graduated scale on said support to cooperate with said second mentioned slot, a stud slidable in said first mentioned slot, a plate connected to pivot about said stud, said plate containing a slot, a plurality of graphs and a fixed graduated scale thereon, a slide containing a graduated scale slidably connected to said plate to cooperate with said last mentioned fixed graduated scale, a second stud slidable in said second slot in said support and also in said slot in said plate, a second plate connected to pivot about said second mentioned stud and restricted to move parallel to said slot in said first mentioned plate, a graduated scale on said second mentioned plate, and a strip containing a plurality of graduated scales and slidably connected to said second plate to cooperate with said graduated scale on said second plate and said graduated scale on said slide.

12. A computer of the character described comprising a support member containing two scales that are at right angles to each other to represent the legs of a right triangle, a plate slidably and pivotally connected to said support member to cooperate with said two scales, said plate containing a plurality of graphs and a pair of relatively movable graduated scales, a second plate slidably connected to said first mentioned plate and movable relative to one of said scales on the support member, said second plate containing a pair of relatively movable graduated scales, one of which intersects one of the scales on the first plate.

References Cited in the file of this patent

UNITED STATES PATENTS

| | | |
|---|---|---|
| 1,478,585 | Simpson | Dec. 25, 1923 |
| 1,484,176 | Haimes | Feb. 19, 1924 |
| 1,843,978 | Hensey | Feb. 9, 1932 |
| 2,432,738 | Fairbanks | Dec. 16, 1947 |
| 2,612,316 | Caldwell | Sept. 30, 1952 |